Aug. 8, 1967  A. CAUNT  3,334,886
TORSIONAL VIBRATION DAMPERS AND LIKE ASSEMBLIES
Filed May 5, 1965  2 Sheets-Sheet 2

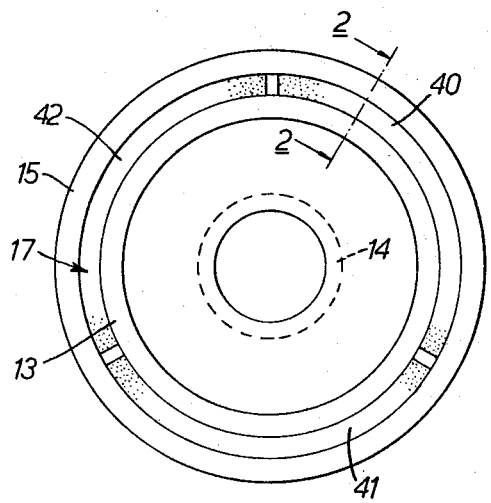
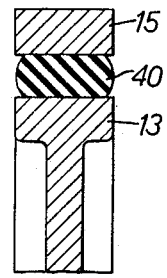
FIG. 1.
FIG. 2.
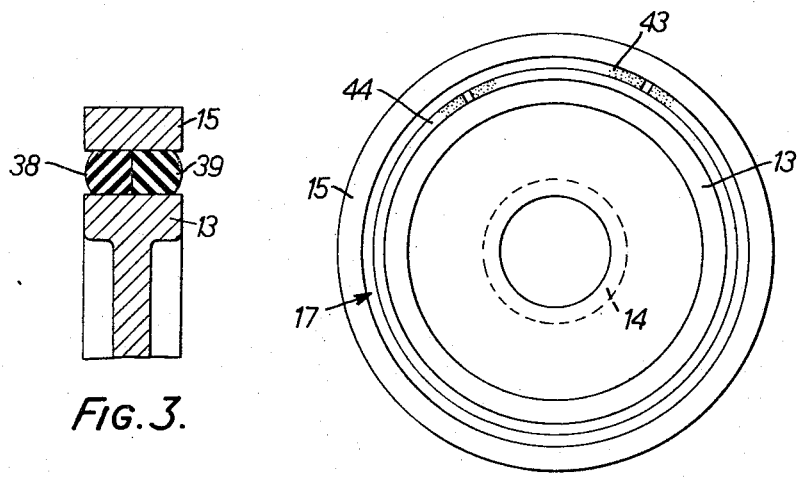
FIG. 3.
FIG. 4.

INVENTOR
Alan Caunt
BY
Russell + Moore
ATTORNEYS

United States Patent Office 3,334,886
Patented Aug. 8, 1967

3,334,886
TORSIONAL VIBRATION DAMPERS AND
LIKE ASSEMBLIES
Alan Caunt, Oadby, England, assignor to Metalastik
Limited, Leicester, England, a British company
Filed May 5, 1965, Ser. No. 453,434
Claims priority, application Great Britain, May 6, 1964,
18,754/64
3 Claims. (Cl. 267—1)

ABSTRACT OF THE DISCLOSURE

A resilient device comprising inner and outer rigid members with an interposed annulus of rubber has its rubber annulus composed of a plurality of rubber strips, the rubbers of different strips having different stiffness values to obtain an overall shear stiffness tolerance for the rubber annulus better than ±5%.

This invention concerns devices of the type (hereinafter referred to as of the type set forth) comprising a pair of rigid concentric nested members and an annulus of rubber or the like material assembled in an annular gap between opposed faces of the members, the rubber annulus being held radially precompressed between said opposed faces. The invention especially relates to torsional vibration dampers but applies also to resilient gear wheels resilient vehicle wheels and so on.

This object of the invention is to provide a device of the type set forth which may more readily be produced within a closer torsional stiffnes tolerance than hitherto.

Figure 5:
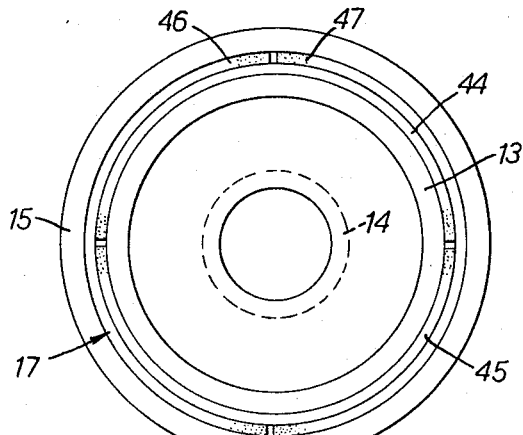
Figure 6:
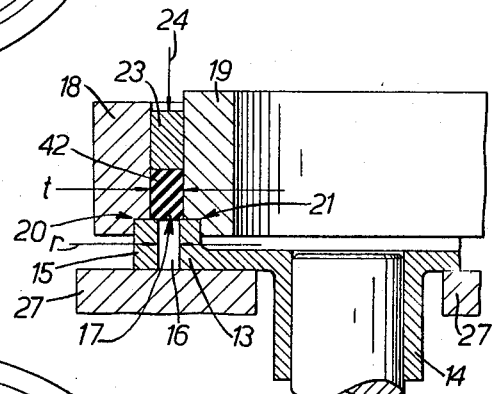
Figure 7:
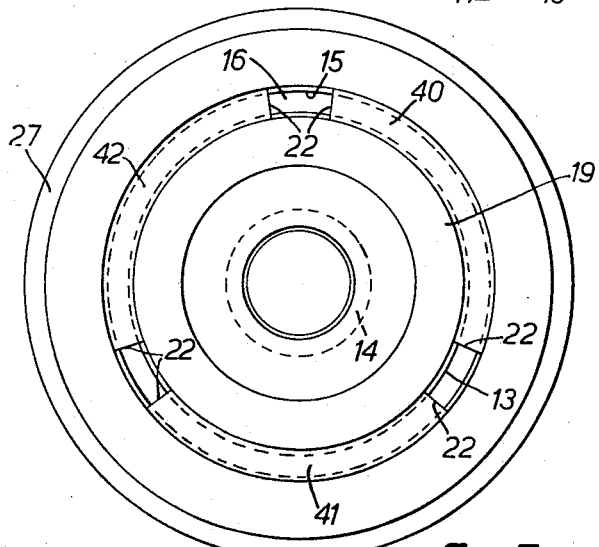

This and other objects of the invention will be understood from the following description given with reference to the accompanying drawings in which:

FIGS. 1 and 2 show by way of example a torsional vibration damper according to the present invention, FIG. 1 being a front elevation and FIG. 2 a partial cross-section on line 2—2 in FIG. 1, FIG. 3 is a partial cross-sectional view corresponding to FIG. 2 showing, by way of further example, a further torsional vibration damper according to the present invention, FIGS. 4 and 5 are front elevations of further torsional vibration dampers according to the present invention which will be described by way of further example and FIGS. 6 and 7 illustrate by way of example a method, according to the present invention, of assembling a torsional vibration damper as shown in FIGS. 1 and 2.

Referring to FIGS. 1 and 2 the torsional vibration damper thereshown comprises an inner hub 13 having a boss 14 for attachment to a shaft (e.g. the crank shaft of an internal combustion engine) and an outer rigid inertia ring 15. The hub 13 is in concentric nested relation with the inertia ring and its outer peripheral face defines with the inner peripheral face of the inertia ring an annular gap in which a rubber annulus, generally indicated at 17, is held in radial precompression by the opposed faces of the hub and the inertia ring.

The rubber annulus 17 made up of three rubber strips 40, 41, 42 extending through equal or roughly equal arcs and lying end to end. Alternatively the strips may extend through widely different arcs or two only of the strips may be of the same arcuate length. FIG. 2 is a cross-section on line 2—2 in FIG. 1 and shows that the strip 40, like the strips 41, 42 extend axially to an extent sufficient to fill out or substantially fill out the annular gap on the assembled device.

The torsional vibration damper shown in FIG. 3 is generally as just described but in this case the rubber annulus 17 is made up of two rubber strips 38, 39 each extending through nearly 360° the strips being positioned one behind the other in the annular gap between the members 13 and 15.

The torsional vibration damper shown in FIG. 4 is generally as above described but in this case the rubber annulus 17 is made up of two rubber strips 43, 44 each extending through nearly 360° the strips being positioned concentrically one inside the other.

The torsional vibration damper shown in FIG. 5 is again generally as above described but in this case its rubber annulus made up of four strips 44, 45, 46, 47 arranged in two concentric nested rings the inner one of which is composed of two of the strips 44, 45 lying end to end and each extending through just less than 180° and the outer one of which is likewise composed of the two strips 46, 47. The radially adjacent strips overlap. Alternatively they may be co-extensive so that the gaps between the adjacent ends of the strips align.

In the torsional vibration damper as just described, the inner strip ring 44, 45 or the outer strip ring 46, 47 could, instead, be made up of one strip only extending through 360° or thereabouts the rubber annulus 17 consisting of three strips only.

In the FIG. 3 construction, each rubber strip 38, 39 may be replaced by two or three rubber strips lying end to end like the strips 40, 41, 42 in FIG. 1.

Many other variations are possible in the disposition and number of strips as will readily be appreciated. Instead of being an inertia ring, this member 15 could be a metal tyre ring or a toothed ring of a resilient gear wheel for example.

With large diameter components constituting devices of the type set forth, certain constructions of rubber annulus within the scope of this invention offer economies since shorter and therefore more easily moulded rubber strips can be used. Particularly with regard to torsional vibration dampers, but also, in other applications however, a further advantage lies in that different rubber strips making up the rubber annulus are composed of different rubber compounds or of similar compounds having different modulus and resilience values. In this way, adjustment of the required properties of the device within narrow limits can be obtained. For example the torsional stiffness of the device or the radial stiffness of the device in different directions may be adjusted within close limits by including strips with different properties. In the same way the damping characteristics may be varied. By this means also a much finer control may be achieved than by any attempt to control the individual properties of a single rubber compound where the rubber annulus is to be made entirely from one rubber material.

In this connection it is preferable to maintain a stiffness tolerance of ±15% on rubber products as this entails controlling the modulus of the rubber compound used to about one third of this tolerance due to the variations introduced by dimensional tolerances, variations in cure, non-homogeneity of the rubber compound, and so on. Where a closer control of stiffness is required, as is often the case with torsional vibration dampers for example, which operate as vibration absorbers tuned to a critical frequency, the amount of control required in blending the compound to achieve the required shear modulus in order to obtain the correct stiffness becomes prohibitive, and stiffness tolerances of ±5% may be the closest achieved—and these but rarely.

Consider now a torsional vibration damper according to any of FIGS. 1 to 5, and supposing a torsional stiffness is required, for example purposes, of 100 units ±3 units. If only one rubber strip is used the problem of achieving these limits is formidable and large quantities of rubber may be rejected as of incorrect stiffness. However, if it is found that two separate batches of rubber give stiffnesses of 96 and 106 units, respectively, one can thus make the damper with 40% of the rubber annulus 17 of the stiff rubber and 60% of the annulus of the soft rubber. The proportions may be judged from the formula $$a = \frac{100y}{x+y}$$

where $a$ is the percentage of the stiff rubber used, and the stiffness obtained by individual rubbers is $100+x$ and $100-y$ units. The damping ratio, or resilience of the whole unit, can be modified in a similar manner.

A method according to this invention as applied to the assembly of the torsional vibration damper shown in FIGS. 1 and 2 is illustrated in FIGS. 6 and 7. The parts 13, 15 are supported by a bed 27 and are held in position thereon, and concentrically by clamp rings 18, 19. The latter are pressed down in any suitable way, for example by a hydraulic press, and the rings are stepped at 20, and 21 respectively accurately to locate the parts 13, 15. The strips 40, 41, 42 are placed in position between the rings 18, 19 so as to form a ring, the adjacent ends 22 of the strips being spaced apart by equal amounts. The strips may be cut from a moulded pad of rubber for example produced to a required controlled thickness $t$ greater than the radial gap $r$ between the inner hub 13 and the outer inertia ring 15. One side dimension of the rubber pad may be equal to the required length of the strips.

A pressure ring 23 is then placed between the rings 18, 19 and pushed axially as indicated by the arrow 24, to force the composite annulus 17 of rubber into the space 16 during which operation the annulus is radially compressed.

While the annulus is being forced into the space 16 the hub member may be rotated or oscillated, for instance at the end of the axial push and while the axial pressure is maintained or the axial movement is interrupted at intervals during which oscillation or rotation occurs. Again oscillation may occur throughout the period while ring 17 is being forced into space 16.

When the rubber annulus is fully positioned in the space 16 the adjacent ends 22 of the three strips may have been closed up so that only a much smaller gap 25 remains between them.

As applied to the assembly of the torsional vibration dampers shown in FIG. 3 or in FIGS. 4 and 5 the strips 38, 39 or the strips 43, 44 or the strips 44, 45, 46, 47 are formed into a ring in the gap between the rings 18, 19 as above described for the strips 40, 41, 42 and the composite annular ring thus formed is forced axially into the space between the inner hub 13 and the outer inertia ring 15.

The strips 38, 39 or the strips 43, 44 may be cut from different pads of rubber of different compounds or of the same compound having different properties which have been moulded with controlled thicknesses which in the case of strips 43, 44 may be the same or different but which together make up a thickness $t$ greater than the radial gap dimension $r$ into which the composite annulus is to be forced so that the annulus is compressed in the gap. The strips 38, 39 are each preferably cut from pads of the same thickness $t$.

The strips 44, 45 and the strips 46, 47 respectively may be cut from different pads of rubber having different properties and each moulded with the same or different controlled thicknesses together making up a thickness greater than the radial gap dimension.

The rubber strips and/or the concentric members may be coated with a lubricant for easier insertion, the lubricant being such that it changes to an adhesive after assembly or being such that the lubricant is lost after assembly (i.e. is absorbed into the rubber) to leave the rubber in frictional contact with the opposed faces of the concentric members.

The method as just described may be modified in that instead of supporting the parts 13, 15 concentrically on the bed 27 they are initially supported eccentrically on the bed to allow the more ready insertion by axial pressure of the strip 40 in FIG. 7 directly between the parts 13 and 15. The parts are then moved to their concentric position and the strips 41, 42 inserted as previously described. Instead the parts could be moved to a further eccentric position to allow the more ready insertion of the strip 41 and then to their concentric position for the insertion of the final strip 42. For the insertion of the final strip 42 the parts may be moved to a third eccentric position temporarily over-compressing the strips 40, 41 to permit the more ready insertion of the strip 42. The degree of eccentricity of the parts adopted may be sufficient to permit the free insertion of any or all of the strips. Once assembled the torsional damper is, of course, freed of any restraints so that the hub settles to a mean, concentric position within the inertia ring. The method as just described is suitable in any case where the rubber annulus 17 is to be composed of two or more separate rubber strips each extending through 180° or less. If strips are to be arranged concentrically like the strips 43, 44 in FIG. 2 this still applies.

I claim:
1. In a torsionally resilient device comprising an inner, rigid member having an outer peripheral face, an outer rigid member having an inner peripheral face, the outer member being concentric with and surrounding the inner member, and an annulus of rubber disposed in an annular gap defined between said inner and outer peripheral faces and held radially compressed thereby, the annulus of rubber in the free state thereof having a radial thickness greater than the radial gap dimension, the improvement which consists in that the annulus of rubber is made up of a plurality of strips of rubber arranged end to end in a ring, the rubbers of different strips having different stiffness values.

2. In a torsional vibration damper comprising an inner, hub member having an outer peripheral face, an outer, inertia member having an inner peripheral face, the inertia member being concentric with and surrounding the hub member, and an annulus of rubber disposed in an annular gap defined between said inner and outer peripheral faces and held radially compressed thereby, the annulus of rubber in the free state thereof having a radial thickness greater than the radial gap dimension, the improvement which consists in that the annulus of rubber is made up of a plurality of strips of rubber arranged end to end in a ring, the rubbers of different strips having different stiffness values to give an overall shear stiffness tolerance for the rubber annulus better than ±5%.

3. A torsional vibration damper as claimed in claim 2 wherein the annulus of rubber is made up of strips of rubber, of two different stiffness values, the proportion of the stiffer rubber present in the rubber annulus being $a\%$ where $$a = \frac{by}{x+y}$$

$b+x$ equals the stiffness of the stiffer rubber, $b-y$ equals the stiffness of the rubber having the lesser stiffness, and $b$ equals the required overall stiffness of the rubber annulus.

References Cited
UNITED STATES PATENTS

| 338,576 | 3/1886 | Whitzel | 152—47 |
| 2,090,179 | 8/1937 | Brownyer | 295—11 |
| 2,470,885 | 5/1949 | Burrows | 295—11 |

FOREIGN PATENTS

| 373,061 | 1907 | France. |

ARTHUR L. LA POINT, *Primary Examiner.*

R. M. WOHLFARTH, *Assistant Examiner.*